(12) United States Patent
Funatsu (10) Patent No.: US 6,335,825 B1
(45) Date of Patent: Jan. 1, 2002

(54) ADJUSTING APPARATUS OF BINOCULAR TELESCOPE

(75) Inventor: Gouji Funatsu, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/181,236

(22) Filed: Jan. 13, 1994

(30) Foreign Application Priority Data

Jan. 14, 1993 (JP) .......................................... 5-000764 U (51) Int. Cl.$^7$ .............................................. G02B 23/00
(52) U.S. Cl. ........................ 359/412; 359/412; 359/406; 359/407; 359/409
(58) Field of Search .................................. 359/412, 407, 359/409, 410, 411, 417, 418, 480, 481, 482, 406, 495

(56) References Cited

U.S. PATENT DOCUMENTS

| | | | | |
|---|---|---|---|---|
| 5,028,123 A | * | 7/1991 | Watanable et al. | 359/418 |
| 5,191,471 A | | 3/1993 | Funathu | 359/407 |
| 5,212,591 A | | 5/1993 | Funathu | 359/407 |
| 5,267,079 A | * | 11/1993 | Riedl | 359/418 |

FOREIGN PATENT DOCUMENTS

| | | | | |
|---|---|---|---|---|
| DE | 4033151 | * | 4/1991 | ................ 359/412 |
| JP | 4215420 | | 9/1942 | |

* cited by examiner

Primary Examiner—Mohammad Sikder
(74) Attorney, Agent, or Firm—Greenblum & Bernstein P.L.C.

(57) ABSTRACT

An adjusting apparatus of a binocular telescope with a binocular body including a pair of juxtaposed telephoto optical systems is provided. The apparatus includes a diopter adjusting shaft for adjusting a difference in diopter between the pair of juxtaposed telephoto optical systems. The diopter is adjusted by rotating the diopter adjusting shaft to move an objective lens in one of the pair of juxtaposed telephoto optical systems. A focus adjusting shaft for adjusting a focus of the optical systems is also provided. The focus is adjusted by moving the focus adjusting shaft in a direction parallel to an optical axis. The focus adjusting shaft rotates the diopter adjusting shaft to move the objective lenses of the pair of optical systems in an integral manner in an optical axis direction. An operation member for rotating the diopter adjusting shaft and a connecting member for connecting the diopter adjusting shaft and the operating member are provided. The diopter adjusting shaft and the operating member are axially movable relative to one another, and the relative rotation of the diopter adjusting shaft and the operating member is impeded.

22 Claims, 7 Drawing Sheets

ADJUSTING APPARATUS OF BINOCULAR TELESCOPE

BACKGROUND OF THE INVENTION

1. Field of the Invention

The present invention relates to an adjusting apparatus of a binocular telescope. More precisely, the invention relates to an adjusting apparatus in which an objective lens of one of two telephoto optical systems is moved in the optical axis direction in accordance with the rotational movement of a dioptric correcting device, and in which objective lenses of the telephoto optical systems are moved together in the optical axis direction in accordance with the rotational movement of a focus adjusting device.

2. Description of Related Art

Conventional binocular telescopes, having a pair of juxtaposed telephoto optical systems whose optical axes are parallel, include various adjusting devices, such as a focus adjusting device or a dioptric correcting device for correcting a dioptric difference between a viewer's eyes, etc. In the case of variable power type binoculars, a power (i.e., magnification) varying device is additionally provided. In general, a binocular telescope has a focus adjusting device which is moved towards the right and left telephoto optical systems and a dioptric correcting devices which independently moves one of the eyepieces to correct a dioptric difference between the eyes of a viewer. Focus adjustment is effected by the focus adjusting device after the dioptric difference is corrected.

In a known adjusting device, an adjusting shaft which is rotated to actuate an adjusting member is provided between right and left telephoto optical systems. The adjusting shaft is rotated by a grip or handle (i.e., operating member) connected thereto. The operating member is exposed to facilitate the rotation of the adjusting shaft.

For instance, once a viewer actuates the dioptric correcting device to adjust the dioptric difference when he or she uses the binocular telescope for the first time, the dioptric correcting device is not actuated again by the same user. The dioptric correcting device is generally not actuated again until another viewer uses the binocular telescope. Accordingly, the location and shape of the operating member of the dioptric difference correcting device are preferably determined so that the operating member can be easily actuated when the dioptric difference is to be adjusted, and is not an obstacle to other binocular operations when adjustment of the dioptric difference is not necessary.

In the focus adjusting device, it is preferable to view an object at a fixed focus determined in accordance with the depth of focus or with the viewer's naked eyes; particularly when the distance of an object to be viewed can be approximated by infinity, or when there is little difference in the object distance. Consequently, the location and shape of an operating member of the focus adjusting device (i.e., focus adjusting ring) should be determined so that the operating member can be easily actuated when the focus is adjusted and is not an obstacle to other binocular operations when no focus adjustment is necessary.

To this end, the assignee of the present application has proposed an improved adjusting apparatus of a binocular telescope in which an operating member is connected to an adjusting shaft which is rotated to move an adjusting member in the axial direction thereof between an operative position in which the operating member protrudes from a body of the binocular telescope and an inoperative position in which the operating member is retracted into the binocular body {for example, U.S. Pat. No. 5,191,471 based on Japanese Patent application No. 2-336523 (Unexamined Publication No. 4-174411)}. In this binocular telescope, on one hand, the operating member can be easily actuated in the operative position thereof, and on the other hand, it is retracted in the binocular body in the inoperative position.

In applying the proposed adjusting apparatus mentioned above to a dioptric adjusting apparatus in a binocular telescope, the objective lens, of one of the right and left telephoto optical systems, is moved in the optical axis direction to deviate the same from the other telephoto optical system in the optical axis direction to thereby correct the dioptric difference. The focus adjusting ring, coaxial to the adjusting shaft, is rotated to move the dioptic difference correcting objective lens, diopter adjusting shaft, and the other objective lens together.

SUMMARY OF THE INVENTION

The primary object of the present invention is to provide an adjusting apparatus of a binocular telescope in which a focus adjusting ring and a dioptric correcting ring have better operability.

To achieve the object mentioned above, according to the present invention, an adjusting apparatus of a binocular telescope with a binocular body including a pair of juxtaposed telephoto optical systems is provided. The adjusting apparatus includes a diopter adjusting shaft for adjusting a difference in diopter between the juxtaposed telephoto optical systems. The diopter is adjusted by rotating the diopter adjusting shaft, and thereby moving an objective lens in one of the pair of juxtaposed telephoto optical systems. A focus adjusting shaft is provided for adjusting a focus of the optical systems. Focus is adjusted by moving the focus adjusting shaft, in a direction parallel to an optical axis. The movement of the focus adjusting shaft moves the diopter adjusting shaft, thereby moves the objective lenses of the pair of optical systems in an integral manner in the optical axis direction. An operation member is provided for rotating the diopter adjusting shaft. A connecting member, for connecting the diopter adjusting shaft and the operating member, is provided so that the diopter adjusting shaft and the operating member are axially movable relative to one another and the relative rotation of the diopter adjusting shaft and the operating member is impeded.

According to another aspect of the present invention, an adjusting apparatus of a binocular telescope is provided and includes a pair of juxtaposed telephoto optical systems having objective lenses an adjusting shaft which is rotated to move the objective lens of one of the telephoto optical systems in an optical axis direction. Also provided are a dioptric correcting member which rotates the adjusting shaft, and a focus adjusting member which is rotated to move the adjusting shaft together with noted objective lens of the one telephoto optical system in the optical axis direction integrally with the objective lens of the other telephoto optical system. The adjusting shaft comprises a first adjusting shaft to be connected to the objective lens of the associated telephoto optical system, and a second adjusting shaft to be connected to the dioptric correcting member. A relative movement permitting mechanism is provided between the first and second adjusting shafts for permitting the first and second adjusting shafts to move relative to one another in the optical axis direction.

The present disclosure relates to subject matter contained in Japanese utility model application No. 05-764 (filed on Jan. 14, 1993) which is expressly incorporated herein by reference in its entirety.

BRIEF DESCRIPTION OF THE DRAWINGS

The invention will be described below with reference to the accompanying drawings, in which.

DESCRIPTION OF THE PREFERRED EMBODIMENT

Figure 1:
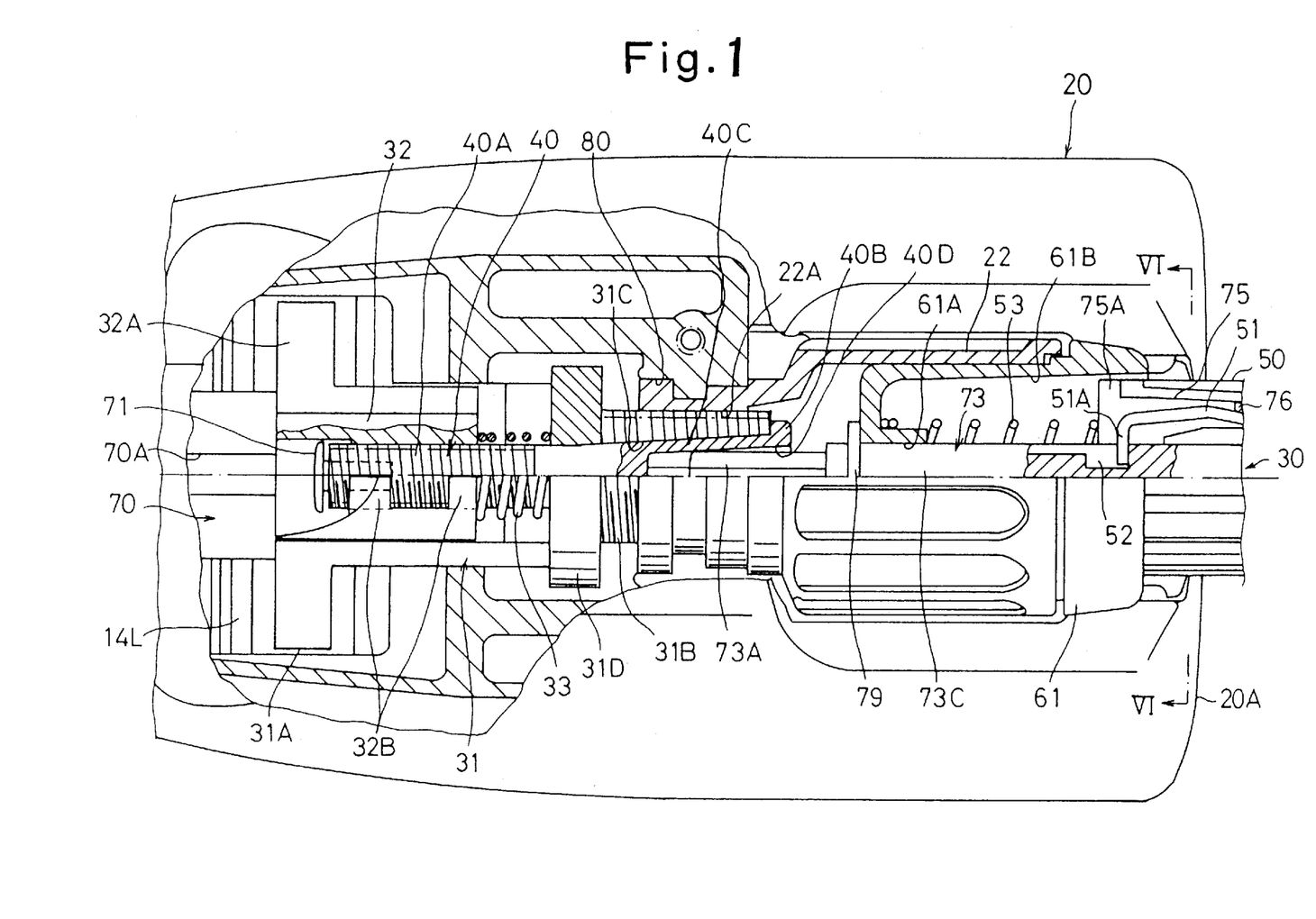
FIG. 1 is a partially broken plan view of a main part of a binocular telescope according to the present invention.
Figure 2:
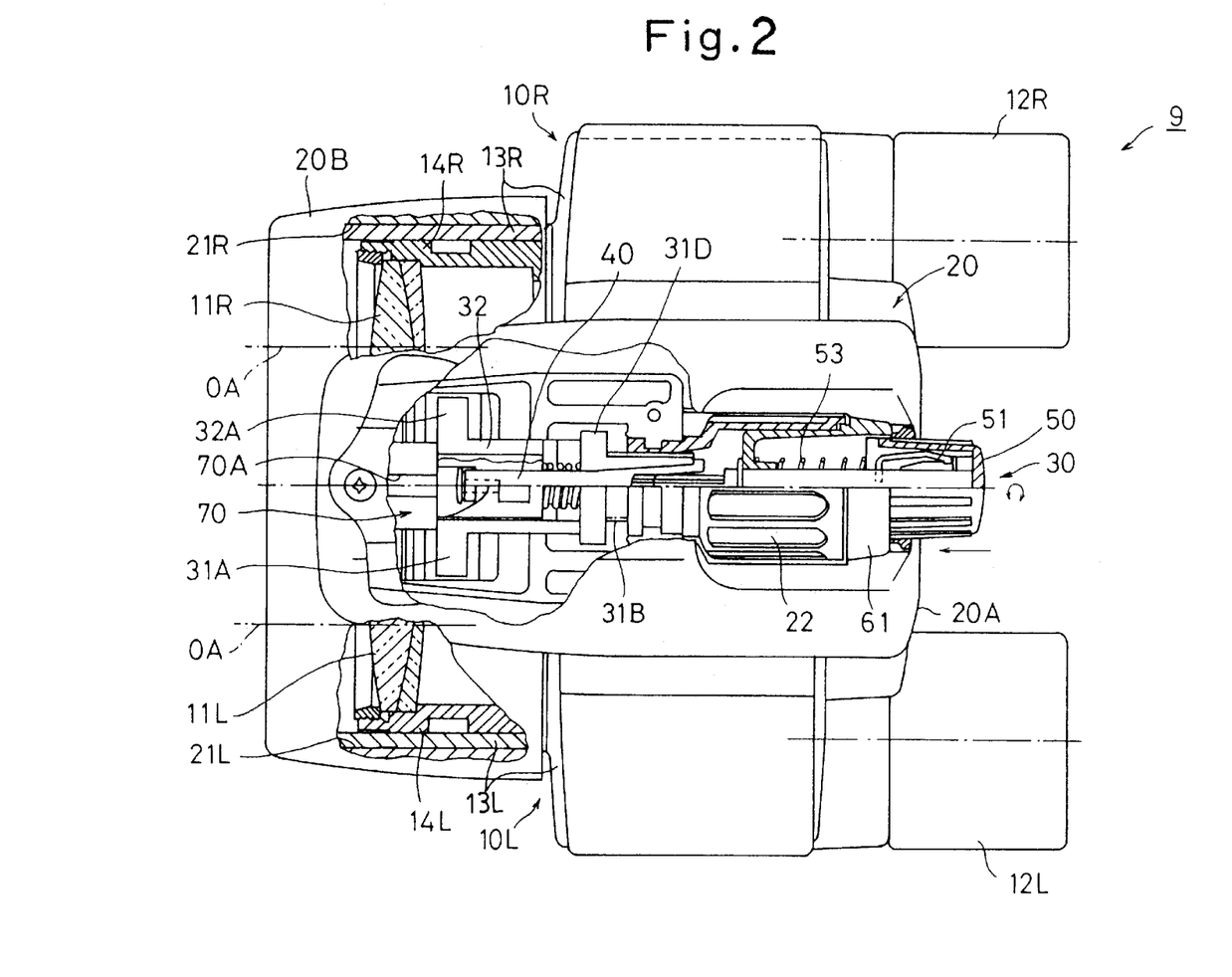
FIG. 2 is a partially broken plan view of a binocular telescope according to the present invention.

The following discussion will be directed to the preferred embodiment of the present invention. FIG. 2 is a partially broken plan view of a binocular telescope having a dioptric adjusting mechanism according to the present invention; and FIG. 1 is an enlarged view of a main part of a binocular telescope shown in FIG. 2.

A binocular telescope 9 includes a binocular body 20, and left and right lens barrels 13L and 13R which are pivoted with respect to the binocular body 20 through respective pivot shafts (not shown) on the left and right sides of the binocular body. These elements are located in this order from the front side of the binocular telescope 9. The binocular body 20 is provided on the upper central portion thereof with a focus adjusting ring 22 which is rotatably attached to the binocular body 20. The binocular body 20 is also provided with a dioptric correcting handle (or grip or operation member or ring) 50 which is located behind the focus adjusting ring 22 to be coaxial and relatively rotatable with respect thereto. When the focus adjusting ring or member 22 is rotated, left and right objective lenses 11L and 11R are moved together in the optical axis direction to adjust the focus. When the dioptric correcting handle 50, which is in a projected position, is depressed and is rotated, only the right objective lens 11R is moved in the optical axis direction to vary the left and right dioptric powers to thereby correct the dioptric difference. The focus adjusting ring 22 and the dioptric correcting handle 50 are independently rotatable. Due to this arrangement, it is an advantage of the present invention that the position of the dioptric correcting handle 50 relative to the binocular body 20 remains unchanged regardless of the rotation of the focus adjusting ring 22.

The binocular telescope 9 includes left and right optical systems 10L and 10R having left and right eyepieces 12L and 12R which are offset from the respective optical axes OA through image erecting optical systems using mirrors or Porro prisms, in addition to the left and right objective lenses 11L and 11R whose optical axes OA are in parallel.

The left and right optical systems 10L and 10R are housed within the respective lens barrels 13L and 13R. The lens barrels 13L and 13R are rotatably fitted in corresponding left and right receiving openings 21L and 21R formed in the binocular body 20 and extending parallel to the optical axes OA. Consequently, the optical systems 10L and 10R are rotatable about the optical axes OA of the respective objective lenses 11L and 11R. Each of the left and right lens barrels 13L and 13R has a front portion that is received in a frame portion 20B formed integrally with the binocular body 20 on the objective side (i.e., left side in FIG. 2), and a rear portion that is formed integrally with the first portion to project rearwardly therefrom.

The rotations of the optical systems 10L and 10R about the optical axes OA of the respective objective lenses 11L and 11R are associated with each other by an association mechanism (not shown), so that the associated rotations of the optical systems 10L and 10R cause the left and right eyepieces 12L and 12R to move away from or close to the binocular body 20 by the same displacement to thereby vary the distance between the eyepieces 12L and 12R, depending on a viewer's inter-eye distance.

Left and right lens frames 14L and 14R which hold the respective objective lenses 11L and 11R are fitted in the corresponding left and right lens barrels 13L and 13R to slide in the direction of the optical axes OA.

The binocular body 20 is provided therein with a guide portion 70 which extends in parallel with the optical axes OA and between the left and right objective lenses 11L and 11R, and a supporting portion 80 which rotatably supports the focus adjusting ring 22 to prevent the focus adjusting ring's movement in the optical axis direction. Moreover, the binocular body 20 is also provided therein with an adjusting mechanism 30 (i.e., blade unit) having a dioptric adjusting function (i.e., right blade adjusting function) and a focus adjusting function. The adjusting mechanism 30 is disposed between the left and right optical systems 10L and 10R and between and above the receiving openings 21L and 21R.

The adjusting mechanism 30 includes a slider or focus adjusting shaft 31 having a guide projection 31E (FIG. 4) which is slidably fitted in a guide groove 70A of the guide portion 70, and the focus adjusting ring (i.e., operating ring) 22 which is rotatably supported by the supporting portion 80 without moving in the optical axis direction OA.

The slider 31 is provided, on the center portion thereof in the optical axis direction, with a flange 31D, and on the front end thereof with a left blade 31A integral therewith that is engaged by the left lens frame 14L of the left optical system 10L. The slider 31 is also provided with a focus adjusting screw 31B integral therewith that is located behind the flange 31D (i.e., on the eyepiece side). The adjusting screw 31B is screw-engaged in a threaded hole (i.e., female screw) 22A formed on the inner peripheral surface of the operating (or focus adjusting) ring 22, so that when the operating ring 22 is rotated, the adjusting screw 31B integrally rotates with the left blade 31A (i.e., slider 31) and is reciprocally moved in a direction parallel with the optical axis OA.

Figure 3:
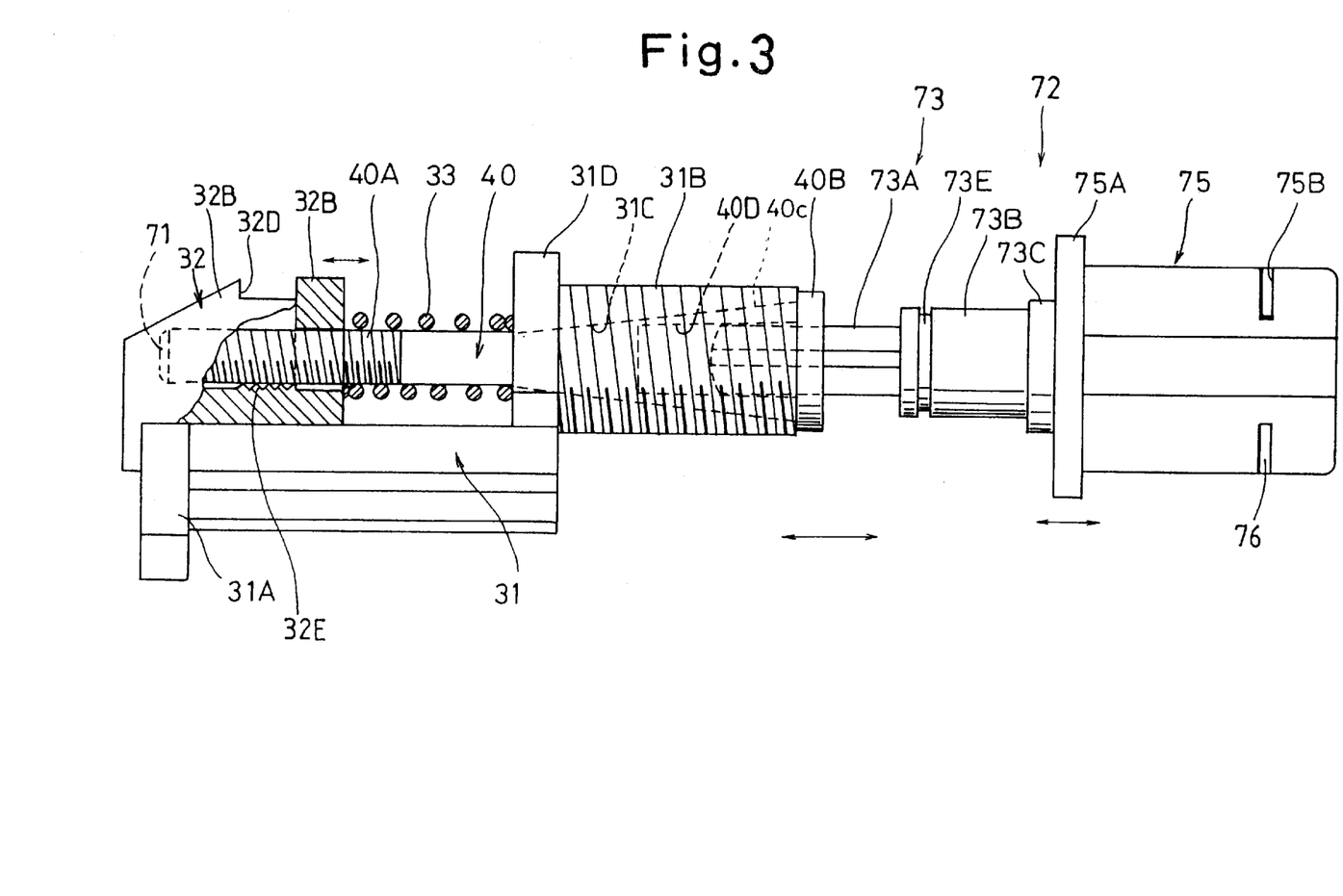
FIG. 3 is a side elevational view of first and second dioptric adjusting shafts which are interconnected and which constitute a relative movement permitting means, according to present invention.
Figure 4:
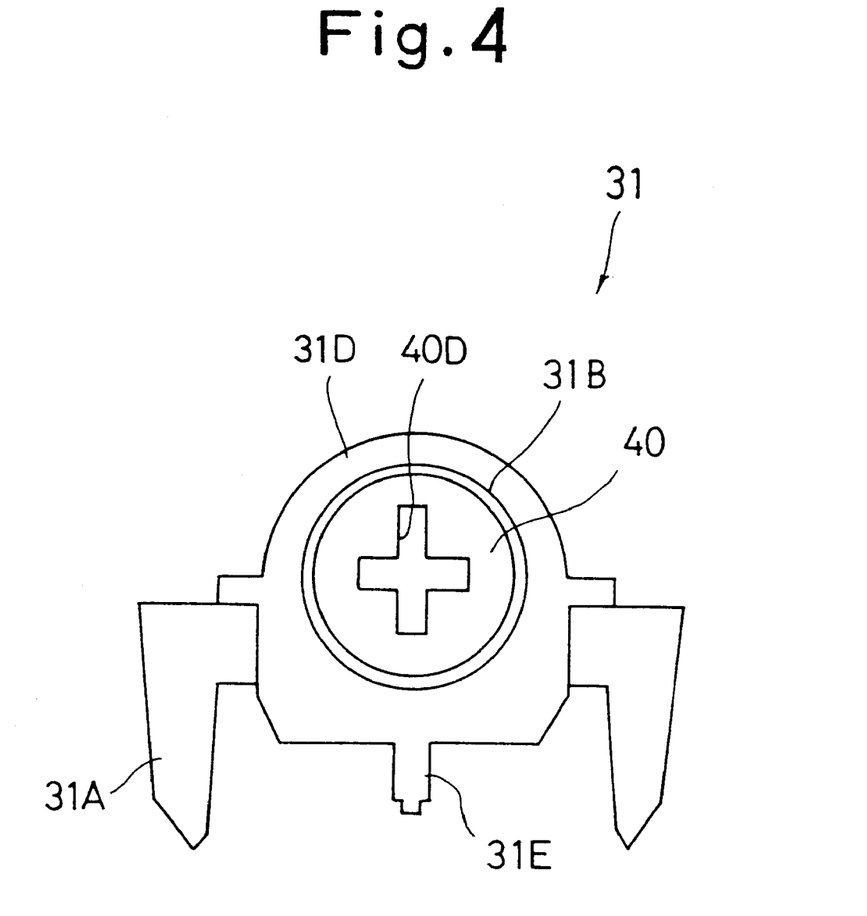
FIG. 4 is a rear end view of a first dioptric adjusting shaft shown in FIG. 3.

Referring to FIG. 3, the adjusting screw 31B of the slider 31 has a tapered central axial hole 31C through which a first dioptric correcting shaft (or first adjusting shaft) 40, as an adjusting shaft, rotatably extends. The first dioptric correcting shaft 40 is provided with a front male screw portion 40A formed on the front peripheral surface thereof, a flange portion 40B formed on the rear end of the first dioptric correcting shaft 40, a tapered portion 40C formed between the front male screw portion 40A and the rear flange portion 40B, and a sliding connecting blind hole 40D which axially extends from the rear end of the first dioptric correcting shaft 40. The tapered portion 40C has a shape corresponding to the shape of the tapered axial hole 31C of the slider 31, so that the tapered portion 40C is snugly fitted in the tapered axial hole 31C. The sliding connecting blind hole 40D has a cross-shape at least at the rear end thereof, as can be seen in FIG. 4.

In the sliding connecting blind hole 40D of the first dioptric correcting shaft 40, a connecting shaft 73 of a second dioptric difference correcting or adjusting shaft or second adjusting shaft, 72 is fitted. Connecting shaft 73 has a grip or handle 75 in which the connecting shaft (or second adjusting shaft) 73 is slidably fitted. The dioptric correcting handle (or grip) 50 is fitted and attached to the grip 75.

Figure 5:
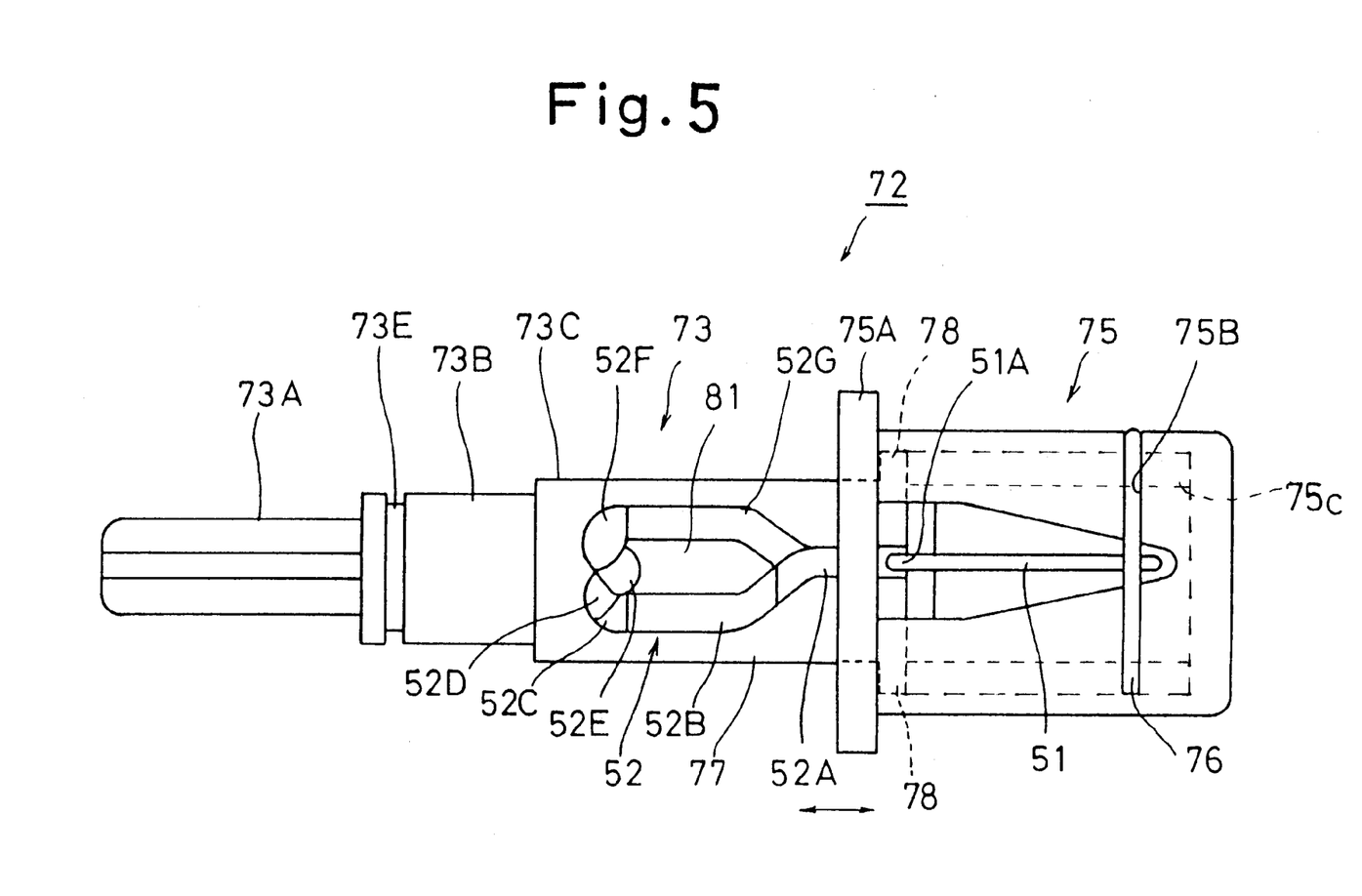
FIG. 5 is a side elevational view of a second dioptric adjusting shaft having a grip that projects rearwardly, shown in FIG. 3.

Referring to FIG. 3 and FIG. 5, the connecting shaft or member 73 is provided on the front end thereof with a connecting front end (i.e., shaft portion) 73A which is fitted in the sliding connecting hole 40D of the first dioptric correcting shaft 40. The connecting shaft 73 is also provided with a small diameter portion 73B which is connected to the connecting front end 73A and a large diameter portion 73C. The image diameter portion 73C has an engaging groove 52 (see FIG. 7), connected to the small diameter portion 73B. The small diameter portion 73B is provided on the front end thereof with a peripheral groove 73E in which an E-ring 79 can be fitted upon assembly. The connecting front end 73A has a cross-shape corresponding to the shape of the sliding connecting hole 40D, as can be seen in FIG. 5. When the connecting front end 73A is inserted in the sliding connecting hole 40D from the rear side, the connecting front end 73A is slidable in the optical axis direction but not rotatable within the sliding connecting hole 40. The grip 75 has a flange 75A at the front end thereof and a fitting groove 75B in which an annular spring 76 (see FIG. 5) is fitted.

Figure 6:
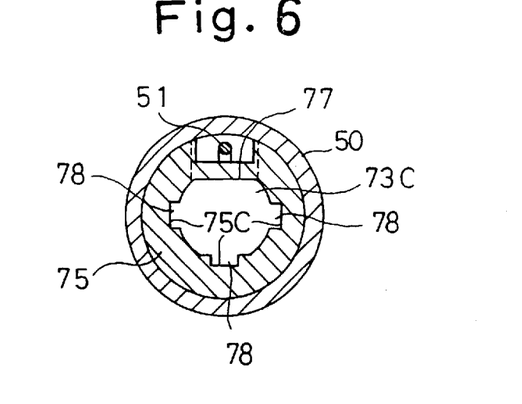
FIG. 6 is a sectional view along the line VI—VI in FIG. 1.

Referring to FIG. 6, the large diameter portion 73C of the connecting shaft 73 has a flat surface portion 77 and three key projections 78 that are located on the side opposite to the flat surface portion 77 and on diametrically opposite sides with respect to a line connecting the flat surface portion 77 and the key projection 78 opposite thereto, as can be seen in FIGS. 5 and 6. The grip 75 is provided on the inner peripheral surface thereof with three key ways 75C corresponding to the key projections 78, so that the latter can be slidably fitted in the corresponding key ways 75c.

Referring back to FIG. 1, the grip 75 has an engaging arm 51 of a circular spring rod which is bent in a predetermined shape, so that one end (i.e., rear end) of the engaging arm 51 engages with the grip 75 and the other end (i.e., front end) 51A thereof extends inwardly. The intermediate portion of the engaging arm 51 is bent outward. The front end 51A is not only displaceable in the radial direction of the grip 75, owing to the elastic deformation of the engaging arm 51, but also swingable in the circumferential direction within a predetermined limit. The annular spring 76 fitted in the fitting groove 75B biases the engaging arm 51 in the inner peripheral direction of the grip 75 at a position shown in FIG. 5.

As shown in FIG. 1, a bearing 61 has an insertion hole 61B in which the grip 75 and the dioptric correcting handle 50 are inserted, and a supporting hole 61A in which the large diameter portion 73C of the connecting shaft 73 is rotatably supported, as shown in FIG. 1. A return spring 53 is compressed between the inner front end of the bearing 61 and the flange 75A of the grip 75, when the bearing 61 is attached to the rear end of the operating ring 22, the large diameter portion 73C is inserted in the supporting hole 61A, and the grip 75 and the dioptric correcting handle 50 are fitted in the insertion hole 61B, respectively. The rearward movement of the grip 75 (and the dioptric correcting handle 50) is restricted by a front end (engaging end) 51A of the engaging arm 51 that is fitted in the engaging groove 52 of the large diameter portion 73C. Namely, no further movement of the grip 75 (i.e., dioptric correcting handle 50) in the backward direction takes place from the position shown in FIG. 1. The E-ring 79 which is fitted in the fitting groove 73E (FIG. 3) of the large diameter portion 73C prevents the grip 75 (i.e., dioptric correcting handle 50) from being disengaged from the bearing 61.

Figure 7:
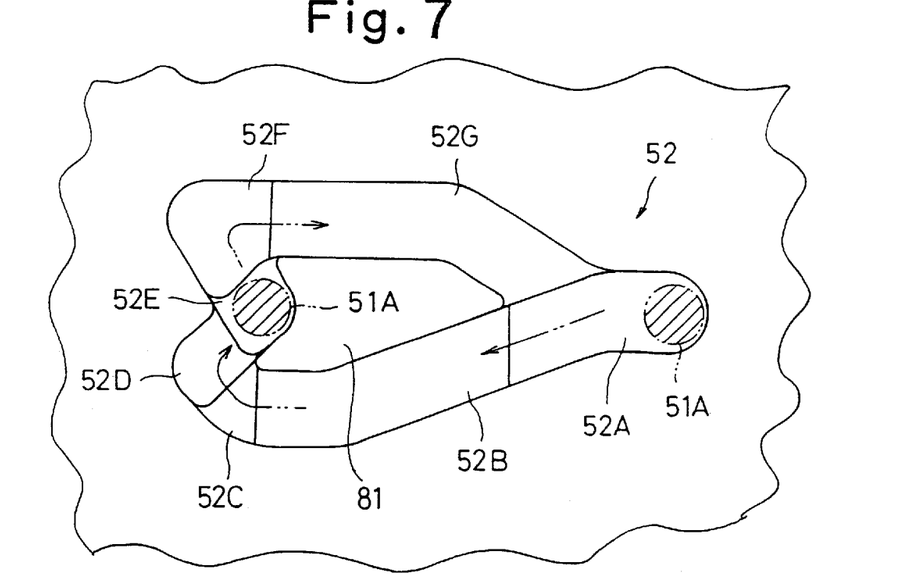
FIG. 7 is an enlarged view of an engaging groove.

The engaging groove 52 formed on the flat surface 77 of the connecting shaft 73 surrounds a land portion 81 and has a width large enough to movably receive the front end 51A of the engaging arm 51, as can be seen in FIGS. 5 and 7. The engaging groove 52 includes a base end portion 52A on the rear side (right side in FIG. 7), an engaging recess portion 52E on the front side, a lower passage portion 52B which extends from the base end portion 52A to the front engaging recess portion 52E on the lower side in FIG. 1, and an upper passage portion 52G which extends from the front engaging recess portion 52E to the base end portion 52A on the upper side in FIG. 1. The lower passage portion 52B which extends forwards from the base end portion 52A is slightly bent in the upper and right oblique direction in the vicinity of the engaging recess portion 52E. The shape of the upper passage portion 52G is substantially symmetrical with that of the lower passage portion 52B with respect to a line connecting the base end portion 52A and the front end portion 52E. Thus, the engaging groove 52 defines an endless (or closed) guide passage for the front end 51A of the engaging arm 51.

Figure 8:
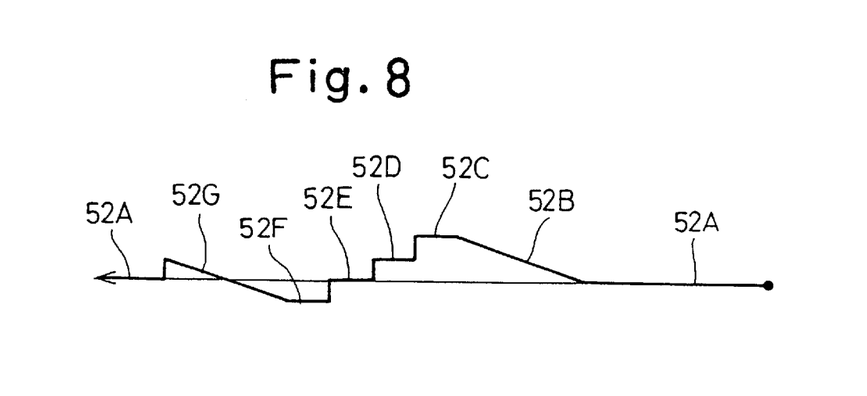
FIG. 8 is an explanatory view of an engaging groove having different depths, shown in FIG. 7; and, FIG. 9 is an enlarged view of a single movable member.

The engaging groove 52 has different depths at the different circumferential portions thereof. FIG. 8 shows a variation of the depth of the engaging groove 52 when the engaging groove 52 is developed and viewed in the clockwise direction in FIG. 7. Looking at FIG. 8, the depth of the engaging groove 52 gradually decreases from the base end portion 52A towards the most shallow portion 52C through an inclined surface portion 52B. The depth of the engaging groove 52 then increases in a stepwise manner from the most shallow portion 52C towards the deepest portion 52F through a stepped portion 52D and the engaging recess portion 52E, then gradually decreases from the deepest portion 52F through an inclined surface 52G and increases stepwise towards the base end portion 52A.

Figure 9:
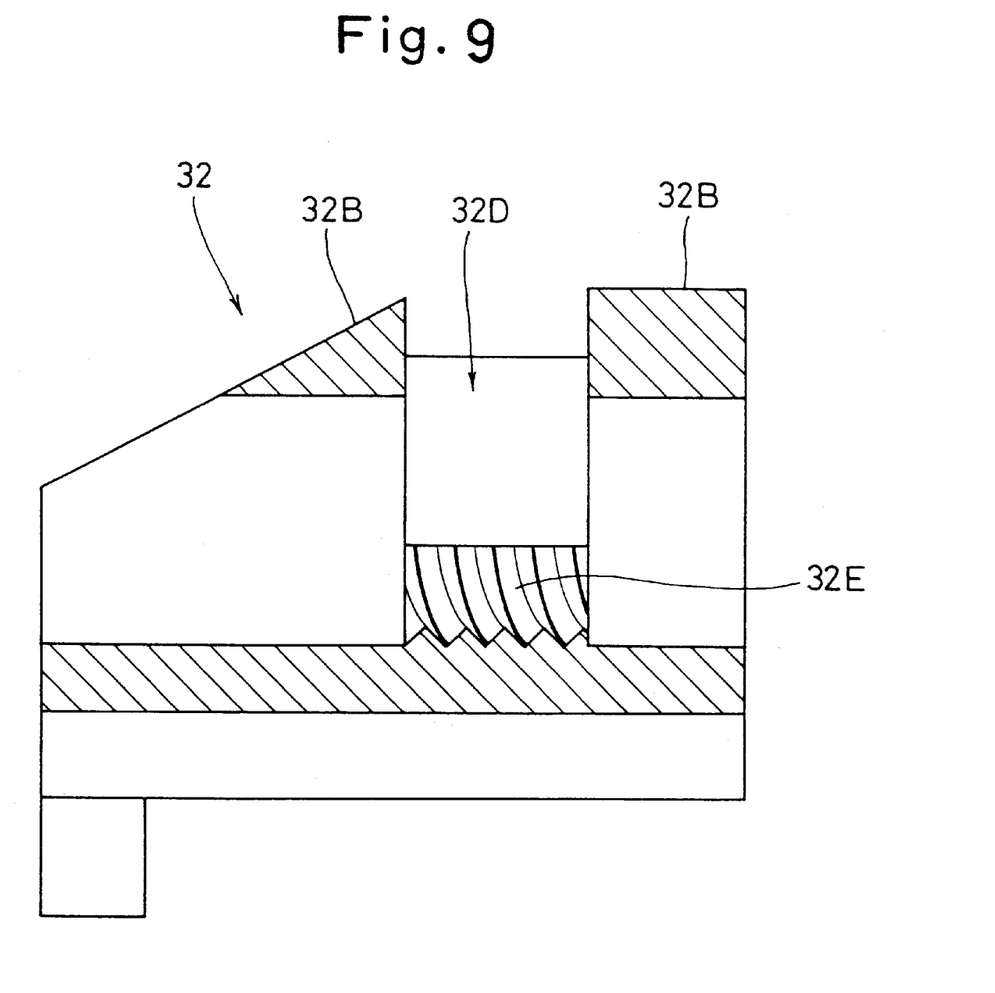

Referring to FIG. 2, the movable member 32 having a right blade 32A integral therewith is fitted in the left blade. 31A (i.e., slider 31) to move in the optical axis direction. The right blade 32A is engaged by the right lens frame 14R of the right optical system 10R. As can be seen FIG. 9, the right blade 32A is integrally comprised of a connecting portion 32B, a hole 32D which extends through the connecting portion 32B in the radial direction at an axially intermediate portion thereof, and a dioptric adjusting threaded portion 32E which is formed only on the lower half of the inner peripheral surface of the connecting portion 32B to correspond to the hole 32D. In the movable member 32 as constructed above, the threaded portion 32E, formed on the inner periphery of the connecting portion 32B, can be integrally molded with the connecting portion 32B at one time by inserting a part of a molding die through the hole 32D.

Referring back to FIG. 3, the dioptric adjusting threaded portion 32E is threadedly engaged by the threaded portion 40A of the first dioptric correcting shaft 40 which is inserted from the rear end (i.e., right end in FIG. 3) of the movable member 32. The threaded portion 40A is provided on the front end thereof with a stop screw 71 which prevents the detachment of the first dioptric difference correcting shaft 40. A compression spring 33 is provided between the flange 31D and the connecting portion 32B to continuously bias the flange 31D and the connecting portion 32B to move away from one another to thereby eliminate a backlash between the inner peripheral thread of the threaded hole 22A and the focus adjusting screw 31B and a backlash between the threaded portion 40A and the threaded portion 32E.

The adjusting mechanism of a binocular telescope, as constructed above, operates as follows.

In the projected position in which the dioptric correcting handle 50 is most projected from the rear end 20A of the binocular body 20, the front end 51A of the engaging arm 51 is located at the base end 52A of the engaging groove 52, so that when the dioptric correcting handle 50 is rotated, the rotation is transmitted to the movable member 32 through the connecting shaft 73 and the first dioptric correcting shaft 40. Namely, when the dioptric correcting handle or operation member 50 is rotated in the clockwise direction or counter-clockwise direction, the movable member or diopter adjusting shaft 32 is moved in the direction of the optical axis OA, so that the lens frame 14R of the right optical system 10R is moved in the same direction. As a result, the position of the right objective lens 11R relative to the left objective lens 11L of the left optical system 10L in the optical axis direction is changed.

Consequently, the right objective lens 11R of the right optical system 10R is moved in the optical axis direction to adjust the axial position thereof with reference to the left objective lens 11L of the left optical system 10L in accordance with the dioptric difference of the right and left eyes of the viewer with reference to the dioptric power of the left eye. Moreover, the correction of a difference in the length of projection of the eyepieces upon focusing, caused by a difference in the focal length of the objective lenses 11L and 11R due to a possible error in the manufacturing or assembling of the objective lenses 11L and 11R, etc., can be carried out by the movement and adjustment of the position of the objective lens 11R in the optical axis direction.

After the adjustment of the length of projection and the dioptric adjustment is completed, when the dioptric correcting handle 50 is pressed forward against the return spring 53 to slide the same into the insertion hole 61B of the bearing 61, the dioptric correcting handle 50 is retracted in the binocular body 20. Consequently, it is impossible for a viewer to rotate the dioptric correcting handle 50. Namely, when the dioptric correcting handle 50 is depressed, the front end 51A of the engaging arm 51 is moved along the lower passage portion 52B of the engaging groove 52, so that the front end 51A reaches the frontmost end of the lower passage portion 52B. Thereafter, when the pressure is released, the dioptric correcting handle 50 is moved backwards by the spring force of the return spring 53, so that the front end 51A of the engaging arm 51 comes to the engaging recess portion 52E and is retained therein.

When the dioptric correcting handle 50 is again depressed against the return spring 53, the front end 51A of the engaging arm 51 is moved from the engaging recess portion 52E of the engaging groove 52 to the portion 52F. Thereafter, when the pressure is released, the front end 51A is moved along the upper passage portion 52G of the engaging groove 52 and the dioptric correcting handle 50 is moved backwards by the spring force of the return spring 53. Consequently, the front end 51A of the engaging arm 51 reaches the base end 52A of the engaging groove 52, so that the dioptric difference correcting handle 50 projects furthest from the rear end of the binocular body 20. In this state, the dioptric correcting handle 50 can be actuated by the viewer.

Namely, every time the dioptric correcting handle 50 is depressed, the same is repeatedly and alternately brought into the retracted position (i.e., inoperative position) in which the dioptric correcting handle 50 is retracted in the binocular body 20 and the projected position (i.e., operative position) in which the dioptric difference correcting handle 50 projects furthest from the rear end of the binocular body. Therefore, no mistaken or accidental operation of the dioptric correcting handle 50 occurs, when the dioptric correcting handle 50 is moved to the inoperative position (i.e., retracted position) after the dioptric correcting operation has been completed by the operation of the dioptric correcting handle 50 in the operative position (i.e., projected position).

Upon completion of the correction of the dioptric difference, the focus adjusting ring (i.e., operating ring) 22 is rotated to move the slider 31 and the movable member 32 and, accordingly, the right and left objective lenses 11R and 11L move together to thereby execute the focus adjustment.

Since the first dioptric correcting shaft 40 and the second dioptric correcting shaft 72 (grip 75) are integral in rotational movement and are independent in axial movement in the optical axis direction through the connecting hole 40D and the connecting shaft 73A fitted therein, the axial movement of the slider 31 is absorbed by the axial movement of the connecting hole 40D relative to the connecting shaft 73A during the adjustment of the focus. Accordingly, no movement is transmitted to the grip 75. Consequently, there is no possibility that the dioptric correcting handle 50 is accidentally moved from the inoperative position (i.e., retracted position) to the operative position (i.e., projected position) as to become an obstacle during the focusing operation.

Although the illustrated embodiment is applied to a binocular telescope in which an operating member is selectively brought into an operative position and an inoperative position, the present invention can be also applied to a binocular telescope having an operating member (i.e., dioptric correcting handle) which is permanently located in the operative position without being retracted into the binocular body.

As can be understood from the above discussion, according to the present invention, the adjusting shaft is comprised of a first adjusting shaft (i.e., first rotatable shaft) to be connected to the objective lens of one of the optical systems and a second adjusting shaft (i.e., second rotatable shaft) to be connected to the dioptric correcting member. A relative movement permitting means is provided between the first and second adjusting shafts to permit the first and second adjusting shafts to relatively move in the optical axis direction, and to prevent accidental or mistaken protrusion of the dioptric correcting member from the binocular body during the rotation of the focus adjusting ring.

What is claimed is:

1. An adjusting apparatus of a binocular telescope with a binocular body including a pair of juxtaposed telephoto optical systems, comprising:
  a diopter adjusting shaft for adjusting a difference in diopter between said pair of juxtaposed telephoto optical system, wherein said diopter is adjusted by rotating said diopter adjusting shaft thereby moving an objective lens in one of said pair of juxtaposed telephoto optical systems;

a focus adjusting shaft for adjusting a focus of said optical systems, wherein said focus is adjusted by moving said focus adjusting shaft, in a direction parallel with an optical axis, which moves said diopter adjusting shaft thereby moving said objective lenses of said pair of optical systems in an integral manner in a direction of said optical axis;

an operation member for rotating said diopter adjusting shaft; and a connecting member for connecting said diopter adjusting shaft and said operation member so as to prevent relative rotation between said diopter adjusting shaft and said operation member and to permit said diopter adjusting shaft and said operation member to move axially relative to each other.

2. The adjusting apparatus of claim 1, further comprising:

a focus adjusting member for moving said focus adjusting shaft forwardly or rearwardly, said focus adjusting member being disposed at a rear part of said binocular body, and being rotatably supported about an axis parallel to said optical axis.

3. The adjusting apparatus of claim 2, wherein a hole is formed at a rear end of said focus adjusting member in which said diopter adjusting shaft is provided in a retractable and rotatable manner.

4. The adjusting apparatus of claim 3, wherein said connecting member is rotatably supported in said focus adjusting member, and wherein movement of said connecting member relative to said focus adjusting member and in a direction parallel to said optical axis is impeded.

5. The adjusting apparatus of claim 4, wherein one end of said connecting member is engaged in a hole coaxially formed in said diopter adjusting shaft, wherein rotation of said connecting member relative to said diopter adjusting shaft is impeded, and wherein said connecting member is axially movable relative to said diopter adjusting shaft.

6. The adjusting apparatus of claim 5, wherein said focus adjusting member is mounted on an end of said connecting member opposite said one end in a manner such that said focus adjusting member is slidably movable in the optical axis direction and rotatably movable together with said connecting member.

7. The adjusting apparatus of claim 1, wherein said focus adjusting shaft is movably supported by the binocular body for movement in said direction parallel to said optical axis between said telephoto optical systems, and wherein said diopter adjusting shaft is coaxially supported within the focus adjusting shaft in a rotatable manner.

8. The adjusting apparatus of claim 7, wherein said diopter adjusting shaft extends through said focus adjusting shaft and moves together with said focus adjusting shaft in said optical axis direction.

9. The adjusting apparatus of claim 8, further comprising a slider which is guided in the optical axis direction and which is engaged with a male screw provided on said focus adjusting shaft, wherein movement of said focus adjusting shaft causes the slider to move in said direction parallel to said optical axis to thereby move both of the objective lenses together in the optical axis direction.

10. The adjusting apparatus of claim 9, wherein said diopter adjusting shaft is movable together with said slider in said direction parallel to said optical axis and is rotatable relative to said slider.

11. The adjusting apparatus of claim 10, further comprising:

a movable member which is slidably guided by said binocular body in said direction parallel to said optical axis, wherein said objective lens in one of said pair of juxtaposed telephoto optical systems is connected to said movable member.

12. The adjusting apparatus of claim 11, wherein said diopter adjusting shaft is provided on a front end thereof with a male screw which is threadedly engaged with said movable member.

13. The adjusting apparatus of claim 12, further comprising:

a spring member provided between said focus adjusting shaft and said movable member so that said focus adjusting shaft and said movable member are separated in said direction parallel to said optical axis, and wherein said focus adjusting shaft and said diopter adjusting shaft include contacting portions by which said slider and said movable member are integrally moved.

14. The adjusting apparatus of claim 13, wherein said movable member is moved in the optical axis direction by the rotation of said diopter adjusting shaft and is moved together with said slider in the optical axis direction by the movement of said focus adjusting shaft.

15. The adjusting apparatus of claim 13, wherein said contacting portions of said focus adjusting shaft and said diopter adjusting shaft are tapered areas coaxially formed in said slider and said movable member.

16. The adjusting apparatus of claim 14, further comprising:

an operating ring which is rotatably supported by the binocular body in a manner such that movement of said operating ring in the optical axis direction is impeded, wherein said operating ring is provided with a threaded portion with which the male screw of said focus adjusting shaft engages.

17. The adjusting apparatus of claim 16, wherein said diopter adjusting shaft is provided with a dioptric correcting handle which projects rearwardly from the male screw thereof and the operating ring.

18. The adjusting apparatus of claim 17, wherein said dioptric correcting handle is integrally rotatable with said diopter adjusting shaft and is relatively movable in the optical axis direction with respect to said diopter adjusting shaft.

19. The adjusting apparatus of claim 18, wherein said dioptric correcting handle is movable between an operative position in which the dioptric correcting handle projects outward from the binocular body and an inoperative position in which it is retracted into the binocular body.

20. The adjusting apparatus of claim 19, further comprising:

an engaging member which retains the dioptric correcting handle in the operative position or the inoperative position.

21. An adjusting apparatus of a binocular telescope comprising:

a pair of juxtaposed telephoto optical systems having objective lenses;

an adjusting shaft which is rotated to move said objective lens of one of said telephoto optical systems in an optical axis direction;

a dioptric correcting member which rotates said adjusting shaft; and a focus adjusting member which is rotated to move said adjusting shaft together with said objective lens of said one of the telephoto optical systems in the optical axis direction integrally with said objective lens of said other telephoto optical system;

wherein said adjusting shaft comprises a first adjusting shaft connected to said objective lens of said one of the telephoto optical systems, and a second adjusting shaft connected to said dioptric correcting member, said first and second shafts mounted for relative movement; and relative movement permitting means provided between said first and second adjusting shafts for permitting said first and second adjusting shafts to move relative to one another in the optical axis direction and for preventing rotational movement between said first and second adjusting shafts.

22. The adjusting apparatus of claim 21, wherein said relative movement permitting means comprises a connecting shaft portion which is provided on said second adjusting shaft and a guide hole in which said connecting shaft portion is provided, said connecting shaft being integral with said guide hole in the rotational direction and movable with respect to said guide hole in the optical axis direction.

* * * * *